Figure 1:
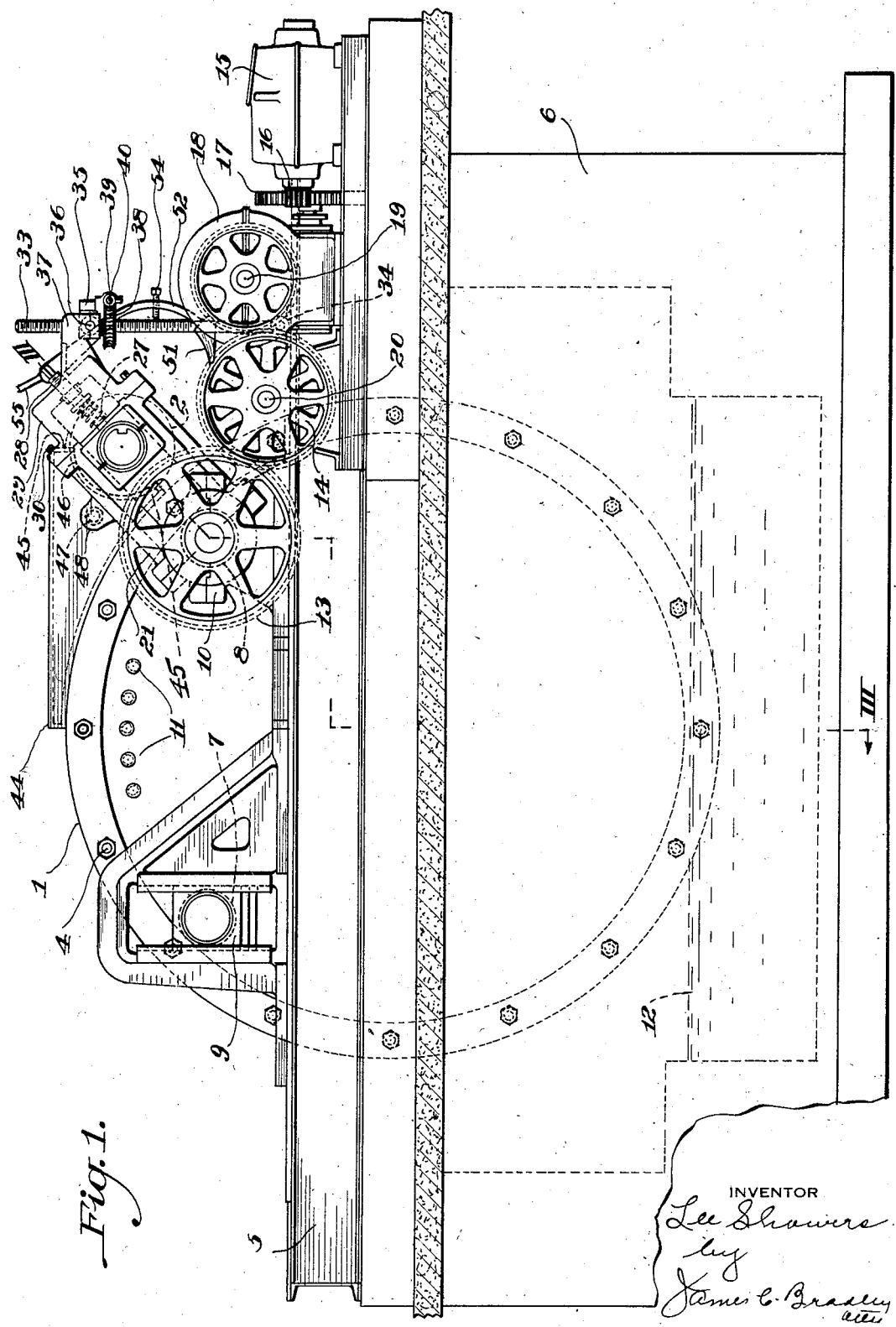

April 6, 1926.

L. SHOWERS

APPARATUS FOR MAKING SHEET GLASS.

Filed July 9, 1925

1,579,666

5 Sheets-Sheet 1

April 6, 1926. 1,579,666

L. SHOWERS

APPARATUS FOR MAKING SHEET GLASS

Filed July 9, 1925 5 Sheets-Sheet 4

April 6, 1926. 1,579,666
L. SHOWERS
APPARATUS FOR MAKING SHEET GLASS
Filed July 9, 1925 5 Sheets-Sheet 5

INVENTOR
Lee Showers
by
James C. Bradley
atty

Patented Apr. 6, 1926.

1,579,666

UNITED STATES PATENT OFFICE.

LEE SHOWERS, OF CHARLEROI, PENNSYLVANIA, ASSIGNOR TO PITTSBURGH PLATE GLASS COMPANY, A CORPORATION OF PENNSYLVANIA.

APPARATUS FOR MAKING SHEET GLASS.

Application filed July 9, 1925. Serial No. 42,467.

*To all whom it may concern:*

Be it known that I, LEE SHOWERS, a citizen of the United States, and a resident of Charleroi, in the county of Washington and State of Pennsylvania, have made a new and useful invention in Improvements in an Apparatus for Making Sheet Glass, of which the following is a specification.

Figure 2:
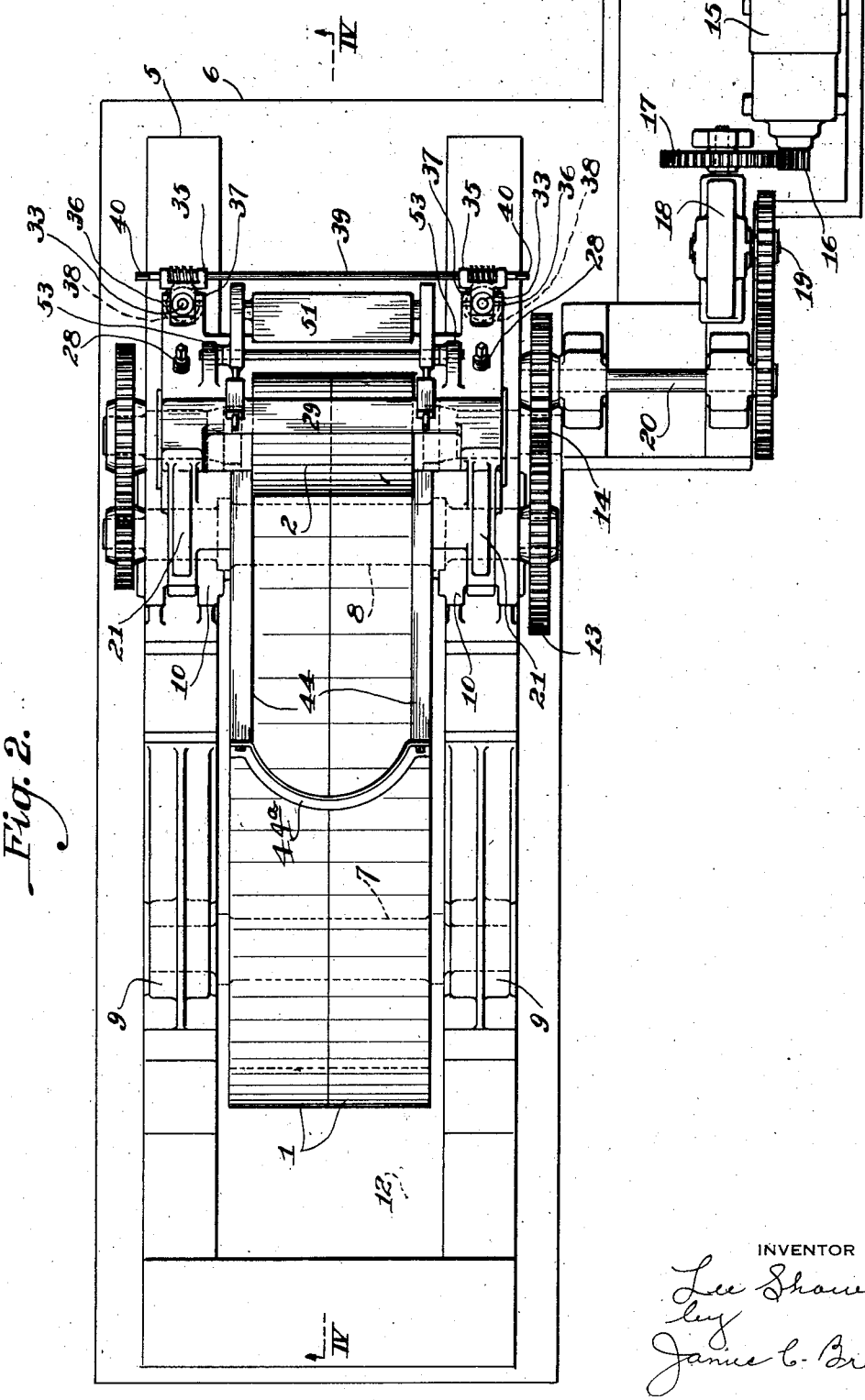
Figure 3:
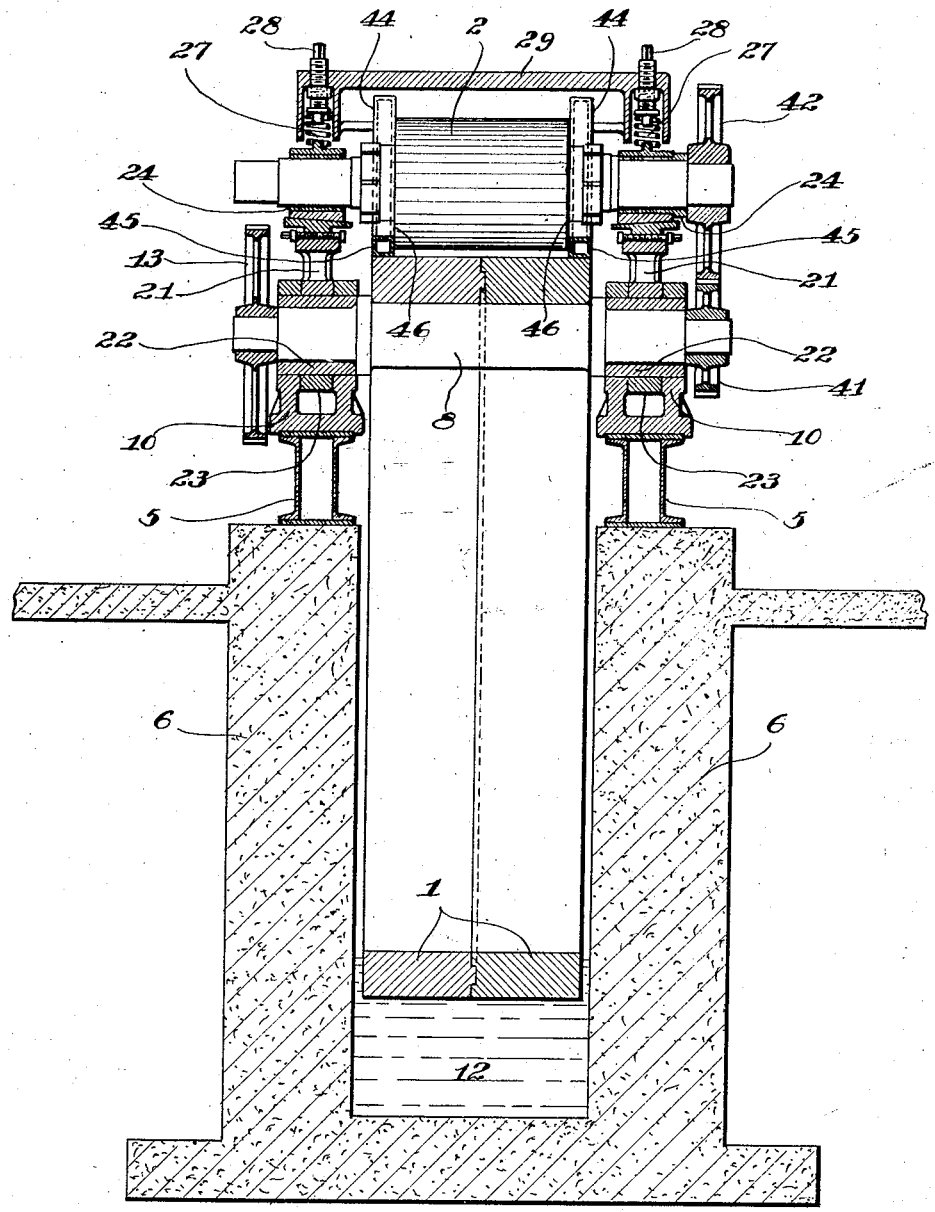
Figure 4:
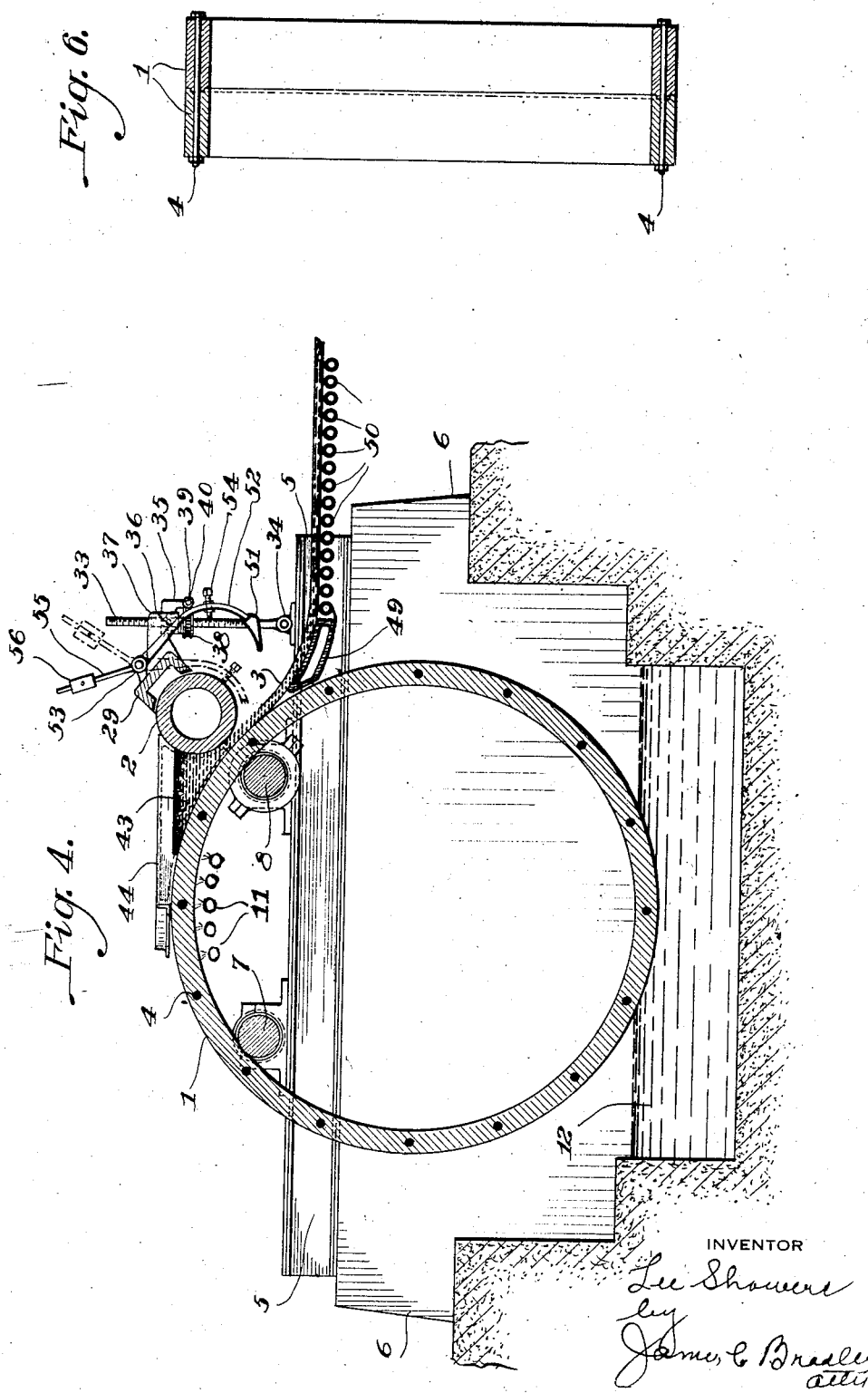
Figure 5:
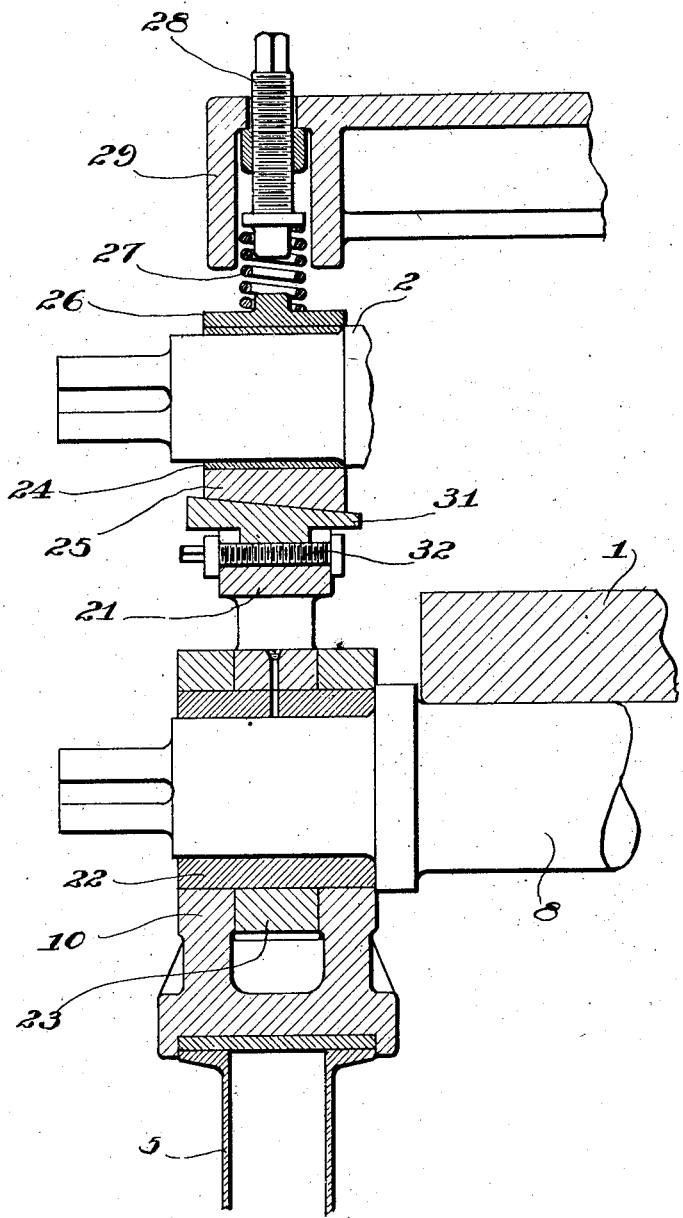

The invention relates to an apparatus for making sheet glass in ribbon form by a combined pouring and rolling operation. The molten glass may be supplied to the rolling apparatus by ladling it from a melting tank, but is preferably supplied from glass melting pots as in the regular plate casting operation, the batch being melted and the glass fined in individual pots in a pot furnace, from which they are removed by means of a crane and carried to the rolling apparatus, where they are poured onto the surface of a roll of large diameter. This roll corresponds in function to the ordinary casting table employed in a plate casting operation, the glass being rolled out to proper thickness by a sizing roll mounted in fixed position over the large roll, which latter is caused to revolve slowly so that it moves with the glass as it passes beneath the sizing roll. The apparatus may be used for making plate glass of ordinary thickness but is also applicable to the making of very thick glass, such as the black or white "Carrara glass" used for wainscoting or other architectural purposes as a substitute for marble. Plate glass rolled in this manner from pot made glass has all the advantages as to quality incident to that made in pots, and in addition has a further advantage over glass cast on tables in the usual way. This further advantage lies in the fact that glass produced by this apparatus is flatter and much smoother than ordinary cast glass, which usually has a rough corrugated surface. The grinding required is thus greatly reduced with a corresponding saving in time, abrasive material, labor, and general overhead. After each pot is cast upon the large roll (which is in effect a table) and such glass carried under the sizing roll into the leer, any old glass or residue which remains adhering to the rolls or associated parts may be removed before the next pot is cast, the procedure having to this extent an advantage over a continuous tank operation, in which an accumulation of devitrified glass, bubbles or stones sometimes occurs at the outlet end of the tank after an extended period of operation and acts to lower the quality of the product. One embodiment of the invention is illustrated in the accompanying drawings wherein:

Figure 1 is a side elevation of the apparatus. Fig. 2 is a plan view. Fig. 3 is a section on the line III—III of Fig. 1. Fig. 4 is a section on the line IV—IV of Fig. 2. Fig. 5 is an enlarged detail section. And Fig. 6 is an enlarged detail section.

The molten glass to be rolled into a sheet or ribbon is poured upon the cast metal shell 1, which is in effect a casting table, such table being carried beneath the sizing roll 2 to form the ribbon or sheet of glass 3. The shell 1 may be made of varying dimensions, depending upon condition, but is preferably about 12 feet in diameter and has a thickness of wall of about 8 inches. As indicated in Fig. 6, the shell is preferably made up of sections secured together by means of the bolts 4. Two of these sections are shown, but the number may be varied depending upon the width of the sheet which it is desired to produce. The shell is mounted for rotation between a pair of I beams 5, 5 seated upon suitable foundation members 6, 6 of concrete, the weight of the shell being carried by the rollers 7 and 8, the latter of which is driven, as later described, in order to rotate the annular shell. These rollers are carried in suitable bearings 9 and 10 mounted upon the I beams, 5, 5. In order to bring the shell 1 to working temperature preliminary to applying the molten glass thereto, the burners 11 are provided extending transversely of the shell above the supporting I beams 5, 5. After the apparatus has been in operation, it may become necessary to cool the shell 1, and for this purpose, the bath 12 is provided (Fig. 4). The cooling effect of this bath may be regulated by circulating water to and from the bath and by varying the level of the liquid in the bath so that it contacts with more or less of the annular member 1. Any other suitable means for controlling the temperature of the casting shell may be employed.

The means for driving the roll 8 and so rotating the shell 1 will be seen by reference to Figs. 1, 2 and 3. The end of the roll is provided with a spur gear 13 engaging a pinion 14, and this pinion is driven from the motor 15 through the intermediary of the pinion and gear 16 and 17, a worm and worm wheel in the casing 18 and a pair of spur gears on the shafts 19 and 20, the latter of which shafts carries the spur gear 14.

The sizing roll 2 is preferably cooled by a circulation of water therethrough and is mounted for rotation in a pair of standards or arms 21, 21 mounted for adjustment about the axle of the roll 8, such adjustment serving the function of varying the distance between the sizing roll and the periphery of the shell 1 and thus regulating the thickness of the glass sheet or ribbon which is to be produced. The method of mounting the arms or standards 21 upon the ends of the roll 8 as an axis will be seen by reference to Figs. 3 and 5. The ends of the roll 8 are journaled in the bushings 22, 22, and the lower ends of the arms 21, 21 are bored out to fit over these bushings as indicated at 23. The axle of the sizing roll 2 is journaled in the bushings 24, 24 carried by suitable boxes, each in two parts 25 and 26, slidably mounted in the upper ends of the arms 21, 21 and pressed yieldingly downward by means of the screws 28, 28. The tension of the springs 27, 27 is adjusted by means of the screws 28, 28 carried by the bridge member 29. This bridge member extends across from one arm 21 to the other arm 21 and is bolted to the ends of these arms as indicated at 30 in Fig. 1. In order to bring the surface of the sizing roll into exact parallelism with the surface of the shell 1, it is desirable that provision be made for the adjustment of the ends of the roll in and out. As indicated in Fig. 5, this is accomplished by means of the wedges 31 engaging the box members 25 and movable in and out by means of the screws 32, such screws being engaged in part by the lower portions of the wedges 31 and in part by the arms 21.

The adjustment of the arms 21 about the axle of the roll 8 in order to vary the distance of the sizing roll from the casting shell is accomplished by means of a pair of threaded rods 33, 33 pivoted at their lower ends to brackets 34, 34 carried by the I beams 5, 5. These rods extend at their upper ends through blocks 35, 35 pivoted at 36, 36 to projections 37, 37 carried by the bridge member 29. These blocks have swiveled thereto worm wheels 38, 38 through which the rods 33, 33 are threaded and the worm wheels are driven by a pair of worms carried by the transverse shaft 39 journaled at its ends in the blocks 35, 35 and having a squared end 40 to which a handle may be applied for rotating it. In this manner, the arms 21, 21 can be swung around the axle of the roll 8 as an axis to give the desired thickness of sheet without affecting the engagement between the pinion 41 and spur gear 42 (Fig. 3) by means of which the sizing roll 2 is driven from the roll 8.

The sizing roll 2 is located with respect to the shell 1 so as to provide a pocket for the reception of the body of molten glass which is to be rolled into a sheet or ribbon as indicated in Fig. 4. In order to close the ends of the pocket, the metal side members 44 are provided at the ends of the sizing roll, such walls being seated upon the periphery of the shell 1 and being provided with tapering ends 45, 45 fitting around into the triangular spaces between the sizing roll and shell and engaging the end surfaces 46, 46 of the sizing roll 2, as indicated in Fig. 3. These side walls 44, 44 are preferably pressed towards each other by means of a pair of springs 47, 47 carried by brackets 48, 48 mounted upon the standards or arms 21, 21, as indicated in Fig. 1. These springs serve to keep the side walls or plates 44, 44 pressed up tightly against the end surfaces 46, 46 of the sizing roll 2 independent of any expansion or contraction of the sizing roll or other parts incident to temperature variations. A tie member 44ª secures the plates 44 together.

In order to receive the sheet of glass 3 as it is formed, a runway is preferably provided in the form of a water-cooled table 49 and the series of fluid cooled rolls 50 which are preferably rotated by means, not shown. Any other desired form of runway might be provided to meet varying conditions. The sheet as thus formed is preferably conducted through a roller leer where it is annealed and cooled to a temperature suitable for cutting and handling, the character of the leer which handles the glass sheet after it is formed constituting no part of the present invention.

The body of glass 43 in the pocket between the rolls 1 and 2 may be supplied from a ladle or from a pot, as heretofore pointed out, and from the body of glass as thus provided, the sheet 3 is rolled out, any old glass remaining in the pocket or adhering to the rolls being cleaned away preliminary to the next casting operation which may follow very shortly after the first operation. In casting very thick glass, the spacing between the sizing roll 2 and the casting roll 1 is such that the molten glass as applied in the pocket behind the sizing roll will flow too freely past the sizing roll unless means are provided to counteract this condition. This requirement is preferably met by the use of a stop bar 51 tapering in form, as indicated in Fig. 4 so as to fit between the sizing roll and the casting roll and obstruct the flow of glass through the slot until a sufficient chilling effect has been exercised to prevent a too free flow. This bar 51 is preferably hollow and water cooled and is supported upon a pair of arms 52, 52 pivoted to the bridge 29 as indicated at 53, 53 (Fig. 2). It is desirable that the stop bar 51 should be held out of contact with the peripheries of the rolls 1 and 2, and this may be accomplished by the provision of a stop screw 54 extending through the arms 52, 52 and engaging the surface of the sizing roll. These screws may be adjusted so the stop bar closely approaches the surfaces of the rolls 1 and 2 without actually engaging such surfaces. The shaft upon which the arms 52, 52 are mounted is preferably provided with a counterweighted lever 55, so that the bar 51 is held in operative position by means of the counterweights. When it is desired to remove the bar 51 and start the flow of glass, the arms 55 are swung through an angle of approximately 45 degrees, so that the counterweights lie upon the other side of the shaft thus holding the bar out of operative position until it is required at the beginning of the next casting operation. The structure as shown is capable of various modifications and adjustments in use depending on conditions and requirements. By shifting their bearings which are bolted to the beams 5, 5, the positions of the rolls 7 and 8 may be shifted, this adjustment and particularly that of the roll 8 serving to vary the dimensions of the pocket which holds the glass. Other guides or supports for the rolls may also be employed and the roll 7 driven as well as the roll 8 if desired.

What I claim is:

1. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, end walls for the said pocket, and a runway for receiving the ribbon or sheet of glass formed between the shell and sizing roll.

2. In combination in apparatus for making sheet glass, a casting table in the form of an annular shell of large diameter, rollers for supporting said shell for rotation, means for driving one of said rolls to cause the rotation of said shell, a sizing roll in opposition to the periphery of the shell positioned so as to provide between the shell and roll a pocket for receiving the molten glass to be rolled, end walls for the said pocket, and a runway for receiving the ribbon or sheet of glass formed between the shell and sizing roll.

3. In combination in apparatus for making sheet glass, a casting table in the form of an annular shell of large diameter, rollers for supporting said shell for rotation, means for driving one of said rolls to cause the rotation of said shell, a driven sizing roll opposite one of said rollers in opposition to the periphery of the shell positioned so as to provide between the shell and roll a pocket for receiving the molten glass to be rolled, end walls for the said pocket, and a runway for receiving the ribbon or sheet of glass formed between the shell and sizing roll.

4. In combination in apparatus for making sheet glass, a casting table in the form of an annular shell of large diameter, rollers for supporting the shell extending therethrough and engaging the inner surface thereof on opposite sides of the vertical center line of the shell, means for driving one of said rolls to cause the rotation of said shell, a sizing roll in opposition to the periphery of the shell positioned so as to provide between the shell and roll a pocket for receiving the molten glass to be rolled, end walls for the said pocket, and a runway for receiving the ribbon or sheet of glass formed between the shell and sizing roll.

5. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, a runway for receiving the ribbon or sheet of glass formed between the shell and roll, and means for applying a cooling fluid to a portion of the shell.

6. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, a runway for receiving the ribbon or sheet of glass formed between the shell and roll, and a cooling bath of liquid engaging a portion of the shell.

7. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, a runway for receiving the ribbon or sheet of glass formed between the shell and roll, and means for heating the shell in advance of said pocket.

8. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, a runway for receiving the ribbon or sheet of glass formed between the shell and roll, and means for heating the interior surface of the shell in advance of said pocket.

9. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, end walls for said pocket supported upon the periphery of said shell and having tapering nose pieces extending into the angular space between the roll and shell, and a runway for receiving the ribbon or sheet of glass formed between the shell and sizing roll.

10. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, end walls for said pocket supported upon the periphery of said shell and having tapering nose pieces extending into the angular space between the roll and shell, and bearing against the end surfaces of the roll, yielding means exerting pressure upon the end walls tending to move them toward each other, and a runway for receiving the ribbon or sheet of glass formed between the shell and sizing roll.

11. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, a pair of standards in which the ends of said roll are journaled mounted for swinging movement so as to permit of an adjustment of the axis of the roll toward and from the shell, means for holding the standards in the position to which they are adjusted, and a runway for receiving the ribbon or sheet formed between the shell and roll.

12. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, a pair of standards in which the ends of said roll are journaled mounted for swinging movement about an axis lying inward of the periphery of the shell, means for holding the standards in the position to which they are adjusted, and a runway for receiving the ribbon or sheet formed between the shell and roll.

13. In combination in apparatus for making sheet glass, a casting table in the form of an annular shell of large diameter, rollers for supporting said shell for rotation, means for driving one of said rolls to cause the rotation of said shell, a driven sizing roll opposite one of said rollers in opposition to the periphery of the shell positioned so as to provide between the shell and roll a pocket for receiving the molten glass to be rolled, a pair of standards in which the ends of said roll are journaled mounted for swinging movement about the axle of the roller which is in opposition to the roll, and means for adjusting the position of said standards and maintaining them in adjusted position.

14. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, end walls for said pocket, and a movable stop bar adapted in one position to cut off the flow of glass through the pass between said shell and the sizing roll.

15. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, end walls for said pocket, and a movable water cooled stop bar adapted in one position to cut off the flow of glass through the pass between said shell and the sizing roll.

16. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, end walls for said pocket, and a stop bar mounted for swinging movement, and adapted in one position, to lie in the pass between said shell and the sizing roll, and in another position, to lie in a position removed from said pass so as to permit of the movement of the glass through the pass.

17. In combination in apparatus for making sheet glass, a casting table in the form of an annular shell of large diameter, roller means for supporting said shell for rotation, a driven sizing roll in opposition to the periphery of the shell positioned so as to provide between the shell and roll a pocket for receiving the molten glass to be rolled, end walls for said pocket, and a stop bar mounted for swinging movement, and adapted, in one position, to lie in the pass between said shell and the sizing roll, and in another position, to lie in a position removed from said pass so as to permit of the movement of the glass through the pass, the said bar being counterweighted so that it is yieldingly held in either one of said positions after it has been moved thereto.

In testimony whereof, I have hereunto subscribed my name this 16 day of June, 1925.

LEE SHOWERS.